(12) United States Patent
Vadgama (10) Patent No.: US 7,149,200 B1
(45) Date of Patent: Dec. 12, 2006

(54) INTERFERENCE REDUCTION IN MOBILE STATIONS FOR CDMA MOBILE COMMUNICATIONS NETWORKS

(75) Inventor: Sunil Keshavji Vadgama, Thornton Heath (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/763,913

(22) PCT Filed: Sep. 21, 1999

(86) PCT No.: PCT/GB99/03129

§ 371 (c)(1),
(2), (4) Date: Feb. 23, 2001

(87) PCT Pub. No.: WO00/18029

PCT Pub. Date: Mar. 30, 2000

(30) Foreign Application Priority Data

Sep. 21, 1998 (GB) ................................. 9820559.4

(51) Int. Cl.
H04B 7/216 (2006.01)

(52) U.S. Cl. ..................... 370/335; 370/342; 370/441

(58) Field of Classification Search ................... None
See application file for complete search history.

(56) References Cited

U.S. PATENT DOCUMENTS

| | | | | |
|---|---|---|---|---|
| 5,151,919 A | * | 9/1992 | Dent ........................... | 370/209 |
| 5,894,500 A | * | 4/1999 | Bruckert et al. ............ | 375/346 |
| 6,067,292 A | * | 5/2000 | Huang et al. ................ | 370/342 |
| 6,137,786 A | * | 10/2000 | Ariyoshi et al. ............ | 370/335 |
| 6,532,254 B1 | * | 3/2003 | Jokinen ....................... | 375/148 |

FOREIGN PATENT DOCUMENTS

| | | |
|---|---|---|
| WO | WO 92/11722 A1 | 7/1992 |
| WO | WO 97 08846 | 3/1997 |

OTHER PUBLICATIONS

"Multiuser Detection for Downlink CDMA Communications in Multipath Fading Channels", Wichman R. et al., IEEE Vehicular Technology Conference, US, New York, IEEE, vol. CONF. 47, pp. 572-576, XP0007836672, ISBN: 0-7803-3660-7.

"Multi-user Detection for DS-CDMA Communications", Moshavi S., IEEE Communications Magazine, US, IEEE Service Centre, Piscataway, N.J. vol. 34, No. 10, pp. 124-136, XP0006944892, ISSN: 0163-6804.

* cited by examiner

Primary Examiner—Chi Pham
Assistant Examiner—Justin M. Philpott
(74) Attorney, Agent, or Firm—Katten Muchin Rosenman LLP (57) ABSTRACT

In a CDMA communications network a mobile station includes wanted signal processing circuitry (12) for processing an input signal (PRX), representing a CDMA transmission signal received at the mobile station from a base station of the network, to derive therefrom a wanted signal embodying a preselected spreading code. The mobile station also includes code information receiving circuitry (52) which receives from the base station code information ($CI_{i1}$–$CI_{im}$) identifying a further spreading code assigned by the network to an interfering signal of another network user. Interfering signal processing circuitry (14) employs the further spreading code identified by the received code information to reduce the interference effect of that interfering signal on the derived wanted signal.

14 Claims, 4 Drawing Sheets

INTERFERENCE REDUCTION IN MOBILE STATIONS FOR CDMA MOBILE COMMUNICATIONS NETWORKS

BACKGROUND OF THE INVENTION

1. Field of the Invention

The present invention relates to code-division multiple access (CDMA) mobile communications networks.

2. Description of the Related Art

In a CDMA mobile communications network, multi-user interference reduces the bit error rate (BER) performance of the radio link and as a result reduces the network capacity. Such performance degradation is exacerbated by imperfect power control and high-rate data users. In the proposed wideband CDMA (W-CDMA) element of the standard referred to as UMTS/IMT2000 the multi-user interference caused by high-rate data users to low-rate service users is expected to be significant. UMTS relates to the Universal Mobile Telecommunications System standard of the European Telecommunications Standards Institute (ETSI) and IMT2000 relates to the International Mobile Telecommunications 2000 standard of the International Telecommunications Union (ITU-R) TG8/1.

Incidentally, in the proposed W-CDMA standard, a high data rate would be 384 kbit/s or 2 Mbit/s, for example. In comparison, a digitised voice signal typically has a low bit rate of, say, 20 kbit/s.

Heretofore, many multi-user interference cancellation techniques have been proposed with a view to reducing and potentially eliminating the performance degradation caused by multi-user interference. However, in practice the complexity of such previously-proposed techniques makes them only suitable for implementation in base stations of a CDMA network. This, however, only enables the performance degradation caused by multi-user interference in the uplink direction (from the mobile stations to the base station) to be addressed.

In UMTS/IMT2000 it is recognised that many services will demand an asymmetric capacity with relatively high bit rates in the downlink direction and relatively low bit rates in the uplink direction, for example Internet web-browsing. For such services having a high bit rate in the downlink direction, multi-user interference cancellation techniques implemented in the base stations are of relatively little value as the uplink-direction bit rates are low.

It is therefore desirable to provide a low-complexity multi-user interference cancellation technique suitable for implementation in a mobile station of the network. Such a technique can increase the effective network capacity in the downlink direction, particularly when the network is providing services to high-rate data users in the downlink direction.

SUMMARY OF THE INVENTION

According to a first aspect of the present invention there is provided a mobile station, for use in a CDMA communications network, including: wanted signal processing means for processing an input signal, representing a CDMA transmission signal received at the mobile station from a base station of the network, to derive therefrom a wanted signal embodying a preselected spreading code; code information receiving means for receiving from the base station code information identifying a further spreading code assigned by the network to an interfering signal of another network user; and interfering signal processing means for employing the further spreading code identified by the received code information to reduce the interference effect of that interfering signal on the derived wanted signal.

According to a second aspect of the present invention there is provided a base station, for use in a CDMA communications network, including: interfering signal designating means for designating at least one of a plurality of downlink signals transmitted by the base station as being an interfering signal having an interference effect on a wanted signal of a subject mobile station of the network; and code information transmission means for including, in a predetermined control signal transmitted by the base station to the said subject mobile station, code information, identifying a spreading code assigned by the network to the designated interfering signal, for use by the subject mobile station to reduce the said interference effect of the said interfering signal on its said wanted signal.

According to a third aspect of the present invention there is provided a CDMA communications network including: a mobile station; and a base station operable to designate at least one of a plurality of downlink signals transmitted thereby as being an interfering signal having an interference effect on a wanted signal of the said mobile station, and also operable to include, in a predetermined control signal transmitted thereby to the said mobile station, code information identifying a spreading code assigned by the network to the designated interfering signal; the mobile station being operable to receive the said predetermined control signal and to employ the said spreading code identified by the code information included in that signal to reduce the said interference effect of that interfering signal on the said wanted signal.

According to a fourth aspect of the present invention there is provided a receiving method, for use in a mobile station of a CDMA communications network, including the steps of: receiving a CDMA transmission signal from a base station of the network; processing an input signal representing the received CDMA transmission signal to derive therefrom a wanted signal embodying a preselected spreading code; receiving from the base station code information identifying a further spreading code assigned by the network to an interfering signal of another network user; and employing the further spreading code identified by the received code information to reduce the interference effect of that interfering signal on the derived wanted signal.

According to a fifth aspect of the present invention there is provided a transmission method, for use in a base station of a CDMA communications network, including the steps of: designating at least one of a plurality of downlink signals transmitted by the base station as being an interfering signal having an interference effect on a wanted signal of a subject mobile station of the network; and including, in a predetermined control signal transmitted by the base station to the subject mobile station, code information, identifying a spreading code assigned by the network to the designated interfering signal, for use by the mobile station to reduce the said interference effect of the said interfering signal on its said wanted signal.

According to a sixth aspect of the present invention there is provided a CDMA communications method, including the steps of: designating at least one of a plurality of downlink signals transmitted by a base station of the network as being an interfering signal having an interference effect on a wanted signal of a subject mobile station of the network; including, in a predetermined control signal transmitted by the base station to the subject mobile station, code information identifying a spreading code assigned by the network to the designated interfering signal; receiving the predetermined control signal at the mobile station and employing the spreading code identified by the code information included in that signal to reduce the interference effect on the wanted signal of that interfering signal.

DETAILED DESCRIPTION OF THE PREFERRED EMBODIMENTS

As is well known, in a direct-spreading (DS) CDMA communications network, each channel between a transmitter and a receiver is assigned a predetermined pseudorandom binary sequence (or code) that modulates the carrier of the transmission signal, spreading the spectrum of the transmission-signal waveform. A large number of CDMA signals can share the same frequency spectrum. At the receiver, the CDMA transmission signals are separated by using a correlator which ideally accepts only signal energy of the channel (the "wanted channel") embodying the assigned binary sequence or code and despreads its spectrum. The CDMA transmission signals of other users (the "unwanted channels"), whose codes do not match, are not despread in bandwidth and, as a result, contribute only to the noise and represent a self-interference generated by the network. This self-interference is exacerbated by multipath propagation which increases the cross-correlation between the spreading codes of different users, leading to an increased multi-user interference. One result of the increased cross-correlation between the codes is that the signals of other users "leak" through the correlator, degrading the BER performance of the wanted signal.

Accordingly, in a CDMA mobile communications network, each downlink channel from a base station to a mobile station is allocated a spreading code, or possibly a combination of spreading codes. For example, one preferred implementation uses a combination of two spreading codes: a so-called long spreading code and a so-called short spreading code. In the latter case, generally each base station employs the same long spreading code for all of its downlink channels.

Generally, high bit-rate channels either make use of multi-code transmission or use a low spread factor (i.e. a low number of chips per symbol). In the case of a low spread factor, for example a factor of 16, because each symbol is composed of fewer chips, in order to maintain sufficient energy per bit at the edge of a cell, a higher transmission power is needed. This higher transmission power results in greater multi-user interference to other users within the cell.

To deal with the problem of multi-user interference in the downlink direction, a base station embodying the present invention broadcasts, using either a channel common to all users (a "common control channel" or "common broadcast channel") or a control channel associated individually with each particular traffic channel (an "associated control channel" or ACCH), code information identifying the spreading code (or each spreading code if multi-code spreading is being used) allocated to at least one downlink channel (the "interfering channel") considered to be carrying a significant interfering signal, e.g. high bit-rate traffic or employing a relatively high transmit power to reach a user who is in a shadow fade, in a building or simply at the edge of the cell. A mobile station embodying the present invention receives the broadcast information from the base station identifying the or each code allocated to the interfering channel(s). As all of the downlink channels received at a particular mobile station from the local base station are subject to the same channel distortion, both the wanted and unwanted user channels suffer the same propagation distortion so a channel estimate valid for the wanted user channel will also be valid for the or each interfering channel. Thus, no separate channel estimate is required for these interfering channels. Furthermore, all of the channels received at the mobile station from a single base station (or from a single sector of a base station) are synchronous and all the channels suffer the same multi-path dispersion. Accordingly, given the code information supplied by the base station identifying the or each code used by the interfering channel(s), the mobile station can select and process the received signals of the interfering channel(s) in such a way as to remove or reduce their interference effect on the received signal of the wanted channel.

By way of example, one embodiment of a mobile station according to the invention will now be described with reference to FIG. 1.

Figure 1:
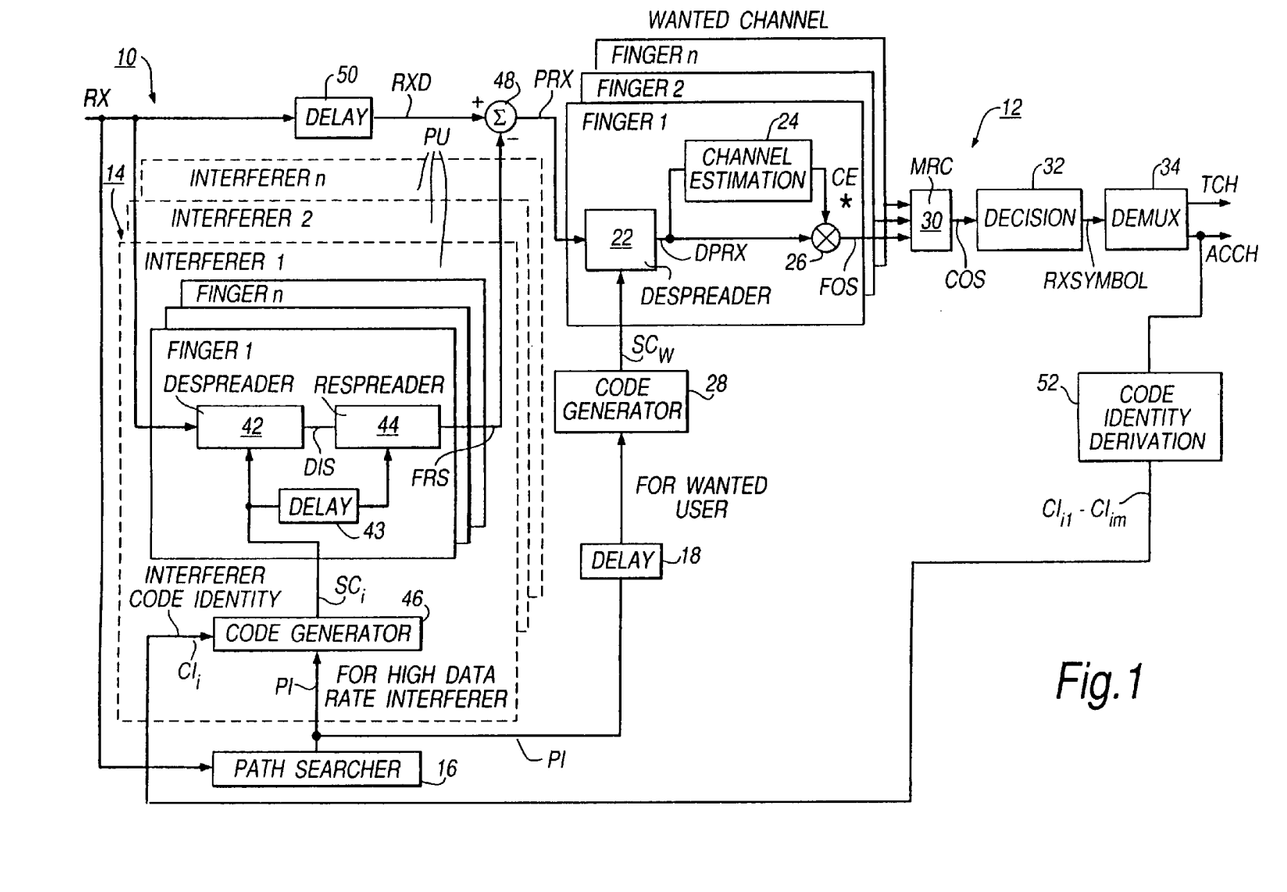
FIG. 1 shows parts of receiving circuitry in a mobile station embodying the present invention.

In FIG. 1, receiving circuitry 10 of the mobile station includes a wanted signal processing section 12, an interfering signal processing section 14, and a path searcher 16.

The wanted signal processing section 12 is in the form of a RAKE receiver having n fingers. In a multi-path environment, multiple versions of the wanted transmission signal sent from the base station will be received at the mobile station. The path searcher 16 in the receiving circuitry processes the signal RX received at the mobile station to identify the n best versions (or paths) of the wanted transmission signal in the received signal RX. Then, each of these n paths is processed individually by a different one of the n fingers in the wanted signal processing section 12.

Each finger of the wanted signal processing section 12 comprises a correlator 22, a channel estimator 24 and a complex-conjugate multiplier 26. The correlator 22 receives a processed version PRX of the received signal RX and despreads (or correlates and integrates over one symbol period) that signal in accordance with a spreading code $SC_W$ assigned to the wanted signal to produce a despread signal DPRX representing the wanted signal. This spreading code $SC_W$ is supplied to the correlator 22 in each finger by a code generator 28. The code generator 28 is connected, via a delay element 18, to the path searcher 16 for receiving therefrom path information PI identifying the n best paths.

In each finger the channel estimator 24 receives the resulting despread signal DPRX from the correlator 22 in its finger and derives therefrom a channel estimate CE for its particular path of the wanted signal. This channel estimate is combined with the despread signal DPRX in the complex-conjugate multiplier 26 to produce a finger output signal FOS for the finger concerned.

The respective finger output signals $FOS_1$ to $FOS_n$ of the n fingers are supplied to a combiner 30 which combines the signals to produce a combined output signal COS representing the wanted signal.

A decision circuit 32 receives the combined output signal COS and, employing a soft-decision process or a hard-decision process, derives from the COS signal a sequence RXSYMBOL of symbols embodied in the wanted signal. This sequence of symbols is applied to a demultiplexer 34 which separates the symbols of the sequence into symbols belonging to a traffic channel TCH of the wanted signal and symbols belonging to an associated control channel ACCH of the wanted signal. The symbols belonging to the TCH and ACCH are output separately from the receiving circuitry 10 to further circuitry of the mobile station.

The interfering signal processing section 14 also comprises a plurality m of processing units PU corresponding respectively to m different interfering signals which the interfering signal processing section 14 is to process. m is, for example, less than or equal to 10; 6 is presently contemplated.

Each processing unit PU is in the form of a RAKE receiver and comprises $n_i$ fingers, each comprising a correlator 42, a delay element 43 and a respreader 44. The number $n_i$ of fingers in a processing unit PU need not be the same as the number n of fingers in the wanted signal processing section 12. Generally, $n_i$ will be less than or equal to n. By making $n_i<n$, the complexity of the interfering signal processing section can be reduced. In this case, for example, only the $n_i$ paths above a certain power level threshold are chosen for processing in the processing unit. If desired, $n_i$ can even be varied between the different processing units PU. For example, a first one, or a first set of, the processing units could have a higher $n_i$ than the remaining processing units; such higher-$n_i$ PUs have a better potential interfering-signal processing effect but will cost more and consume more lower.

Each processing unit PU further comprises a code generator 46 which supplies the correlator 42 in each of the $n_i$ fingers of its processing unit PU with a spreading code $SC_i$ of its corresponding interfering signal. The correlator 42 also receives the received signal RX and despreads it to produce a despread interference signal DIS representing its corresponding interfering signal. The interfering signal DIS is applied to the respreader 44 in the finger which also receives the spreading code $SC_i$ allocated to the interfering signal being processed. The respreader 44 re-spreads the DIS signal of its finger using the allocated spreading code $SC_i$ (delayed by the delay element 43) to produce a finger respread signal FRS for its particular finger.

The respective finger respread signals of the n fingers in all m processing units PU are applied to respective negative inputs of a summing element 48 (only one such negative input is shown in FIG. 1 for the sake of simplicity). The received signal RX is also applied to a delay element 50 which produces a delayed version RXD of the received signal. This delayed signal RXD is applied to a positive input of the summing element 48. The above-mentioned processed version PRX of the received signal is produced at the output of the summing element 48 based on the difference between the RXD signal and the sum of all of the finger respread signals FRS produced by the interfering signal processing section 14.

The interfering signal processing section 14 further comprises a code identity derivation portion 52 which is connected to the output of the demultiplexer 34 for receiving the symbol sequence of the ACCH in the wanted channel. The code identity derivation portion 52 derives from the ACCH symbol sequence respective items of code information $CI_{i1}$ to $CI_{im}$ for the m interfering signals which the interfering signal processing section 14 is to process. These items of code information are applied respectively to the code generators 46 in the m processing units PU. The code generator 46 in each processing unit PU derives the spreading code $SC_i$ for application to the correlator 42 and respreader 44 in each of its n fingers from the received code information $CI_i$. The code generators 46 are also connected to the path searcher 16 for receiving therefrom the above-mentioned path information PI.

Operation of the FIG. 1 circuitry will now be described. As described later in more detail, a base station of the cell in which the mobile station is operating periodically transmits, using the ACCH in this embodiment, the m items of code information $CI_{i1}$ to $CI_{im}$ of the m high-bit-rate interfering signals which the mobile station is to process.

The receiving circuitry 10 in the mobile station processes the received signal RX to extract the symbol sequence RXSYMBOL of the wanted channel and derives therefrom the ACCH symbol sequence which is delivered to the input of the code identity derivation section 52. The code identity derivation section 52 detects the m items of code information CI in the ACCH symbol sequence and delivers the m items to the m processing units PU respectively of the interfering signal processing section 14. The items of code information may be, for example, mapping information in accordance with a conventional form of code-mapping (e.g. in one form of code-mapping a so-called "code tree" is used for generating orthogonal variable spreading factor (OVSF) codes). This is convenient, since conventional code generators are available that are adapted to receive such code-mapping information and to derive the corresponding spreading codes SC from the mapping information. The code identities are generally shorter than the codes to which they correspond, so that bandwidth is also saved. If desired, however, the spreading codes SC themselves may be sent to the mobile station instead of the code identities.

In each symbol period of the transmission signal the path searcher 16 operates to identify the n best paths between the base station and the mobile station. Averaging over more than one symbol period may be applied to enhance the path-searcher performance. As indicated previously, because the channels from a single base station or a single sector of a base station are synchronous and because all the channels suffer the same multi-path dispersion, the best n paths identified by the path searcher 16 for the wanted signal are also the n best paths for the interfering signals. Accordingly, the path information PI identifying the n best paths is supplied in common to the code generator 28 in the wanted signal processing section 12 and to the respective code generators 46 in the m processing units PU of the interfering signal processing section 14.

The path information PI is supplied to the wanted signal processing section 12 via the delay element 18 so that, in each symbol period, the path information reaches the code generator 28 a preselected delay time after it reaches the code generators 46 in the interfering signal processing section 14. This delay is required because of the latency associated with the signal processing performed in the processing units PU. The preselected delay time is chosen such that the delayed path information applied to the code generator 28 is in phase with the processed version PRX of the received signal applied to the input of the wanted signal processing section 12.

In each processing unit PU the $n_i$ fingers then despread the received signal RX using the spreading code SCi of the interfering signal corresponding to that processing unit. The correlator 42 in each finger ideally accepts only signal energy of the interfering signal corresponding to the processing unit PU concerned and despreads its spectrum to reproduce the interfering signal DIS concerned. The delay element 43 delays the application of the spreading code $SC_i$ to the respreader 44, after its application to the despreader 42, by a delay time corresponding to a propagation delay of the despreader 42. The despread signal DIS is then respread by the respreader 44 in the finger concerned to produce the finger respread signal FRS representing the interfering signal of one of the $n_i$ paths.

The processing units PU operate in parallel, with each of them processing a different corresponding one of the interfering signals. The $n_i$ FRS signals produced by each processing unit PU are subtracted from the delayed version RXD of the received signal by the summing element 48 to produce the processed version PRX of the received signal for application to the wanted signal processing section 12. The signal processing in the processing units PU inevitably introduces some delay in the signal processing paths between the receive signal RX and the negative inputs of the summing element 48. The delay produced by the delay element 50 is chosen such that the delayed version RXD of the received signal arrives at the positive input of the summing element 48 in phase with the respread interfering signals FRS.

In the summing element 48 each of the $n_i$ paths of each of the m interfering signals is subtracted from the delayed version RXD of the received signal. In this way, the m interfering signals whose spreading codes were identified to the mobile station can be subtracted or cancelled out from the received signal RX.

The resulting interference-cancelled signal PRX is processed by the wanted signal processing section 12 in the usual manner. Using the path information PI provided by the path searcher 16 and the code $SC_W$ allocated to the wanted signal each finger despreads the wanted signal of one of the n paths identified by the path searcher 16. The channel estimator 24 processes the despread signal DPRX for the path concerned, using for example pilot symbols included in the transmission signal by the base station. The resulting channel estimate CE provides an estimate of the propagation conditions along the path concerned (e.g. delay and fading). The channel estimate CE for the path is then multiplied with the despread signal DPRX in the complex-conjugate multiplier 26 to produce the output signal FOS for that finger.

The n FOS signals are then combined in the combiner 30 to produce the COS signal. The COS signal is demodulated in the decision element 32 to produce the received symbol sequence RXSYMBOL. Symbols belonging to the traffic channel TCH are delivered by the demultiplexer 34 to one output thereof whilst symbols belonging to the associated control channel ACCH are delivered to the other output thereof and to the code identity derivation section 52.

Figure 2:
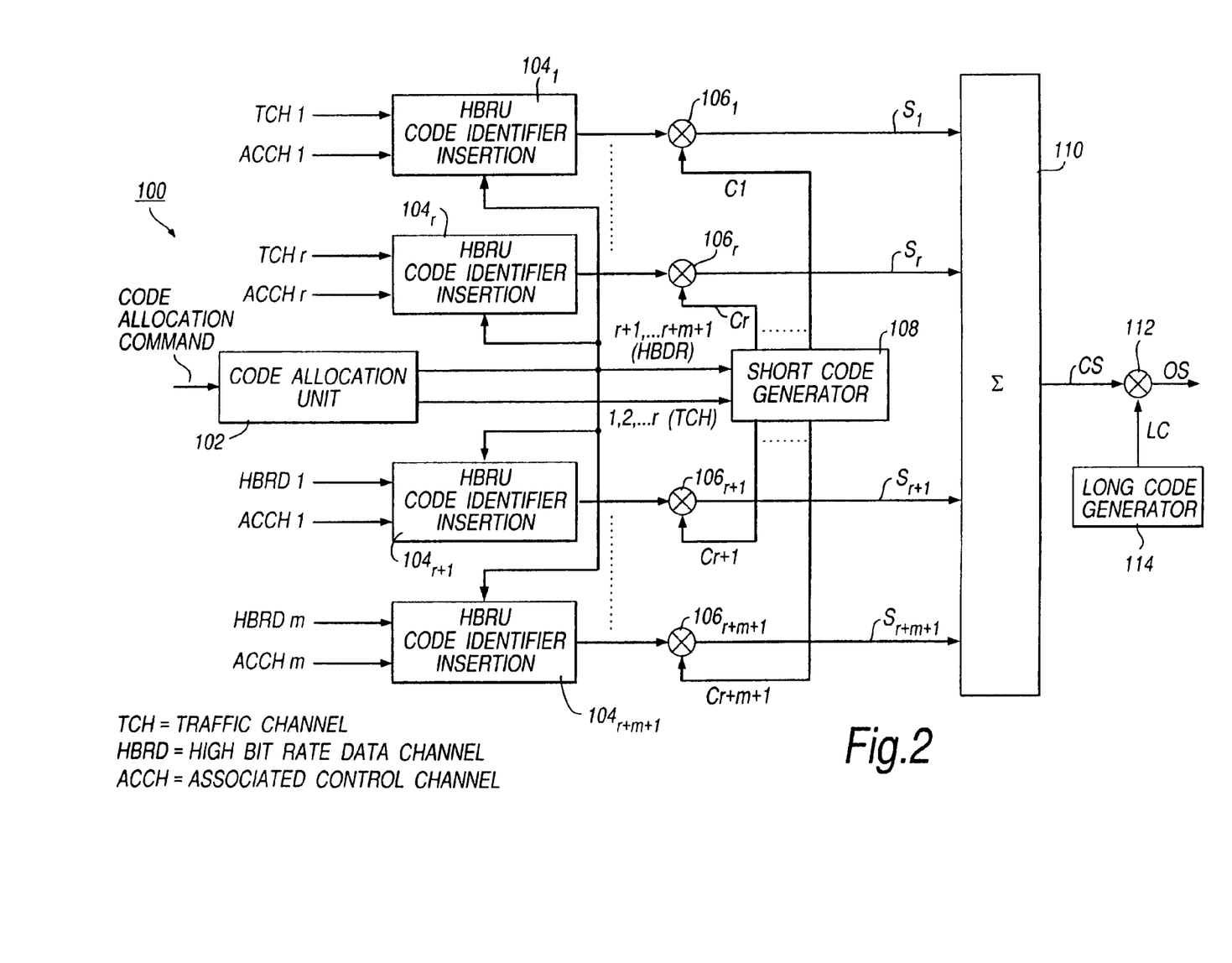
FIG. 2 shows parts of transmitting circuitry in a base station embodying the present invention.

FIG. 2 shows parts of transmitting circuitry included in a base station for transmitting the items of code information CI to the mobile station of FIG. 1.

In this embodiment, it is assumed that the transmission signals employ both short and long codes, and that the long code is the same for all downlink channels of the base station concerned.

In FIG. 2 it is also assumed that there are r normal channels carrying low-or medium-bit rate data, for example voice data. Each of these normal channels has a traffic channel TCH and an associated control channel ACCH. It is also assumed that there are m high bit-rate users (HBRUs), each having a high bit-rate data (HBRD) channel and an associated control channel ACCH.

The transmitting circuitry 100 at the base station comprises a code allocation unit 102, respective HBRU code identifier insertion units $104_1$ to $104_{r+m+1}$, respective spreaders $106_1$ to $106_{r+m+1}$, a short code generator 108, a combiner 110, a further spreader 112, and a long code generator 114.

The code allocation unit 102 receives code allocation commands from further circuitry of the base station and allocates each of the r normal channels and each of the m HBRD channels a particular short code for use in the downlink direction. The code allocation unit 102 produces respective items of code information $CI_1$ to $CI_r$ for the r normal channels and respective items of code information $CI_{r+1}$ to $CI_{r+m+1}$ for the m HBRD channels.

The items of code information are, for example, code-mapping information items, as mentioned previously.

The items of code information $CI_{r+1}$ to $CI_{r+m+1}$ for the HBRD channels are supplied to all of the HBRU code identifier insertion units $104_1$ to $104_{r+m+1}$. These units periodically (e.g. once in every 10 ms frame) include the m items of HBRU code information $CI_{r+1}$ to $CI_{r+m+1}$ in the symbol sequence of the associated control channels ACCH of all users (low/medium bit rate users and high bit rate users). The presence of the items of code information in the ACCH concerned may be denoted by a predetermined header or a predetermined flag in the symbol sequence.

For each user, the symbol sequence of the TCH (or HBRD as the case may be) is combined with the symbol sequence of the ACCH by the HBRU code identifier insertion portion and the resulting combined sequence is applied to one input of the spreader 106 of the channel concerned. The spreader 106 for each channel also receives the short spreading code SC allocated to the channel which is generated by the short code generator 108. The short code generator 108 receives the items of code information $CI_1$ to $CI_{r+m+1}$ for all users and, using the ETSI mapping, produces the appropriate short codes $SC_1$ to $SC_{r+m+1}$ allocated to the users by the code allocation unit 102.

The spreader 106 for each channel spreads the combined TCH/ACCH (or HBRD/ACCH) symbol sequence using the short spreading code SC for its channel and delivers a spread signal S to an input of the combiner 110. The combiner 110 combines all of the spread signals $S_1$ to $S_{r+m+1}$ to produce a combined spread signal. The combined spread signal CS is spread again in accordance with a long code LC applied to the further spreader 110 by the long code generator 114 to produce an output signal OS for transmission to the mobile station.

It will be appreciated that in the FIG. 2 embodiment the m items of code information $CI_{r+1}$ to $CI_{r+m+1}$ are inserted in the ACCH of each HBRU. However, in the mobile station of such an HBRU, the interfering signal processing section 14 must not treat its own wanted signal as one of the interfering signals. To avoid this happening, the transmitting circuitry 100 in the base station may be adapted to omit the HBRU's own item of code information CI from the set of items of code information included in its ACCH. Alternatively, the code identity derivation section 52 in the mobile station may be adapted to compare each item of code information CI received thereby in its ACCH with the code information allocated to the user concerned to avoid passing the user's own item of code information item to the interfering signal processing section 14.

A further embodiment of the present invention will now be explained with reference to FIGS. 3 to 5.

Figure 3:
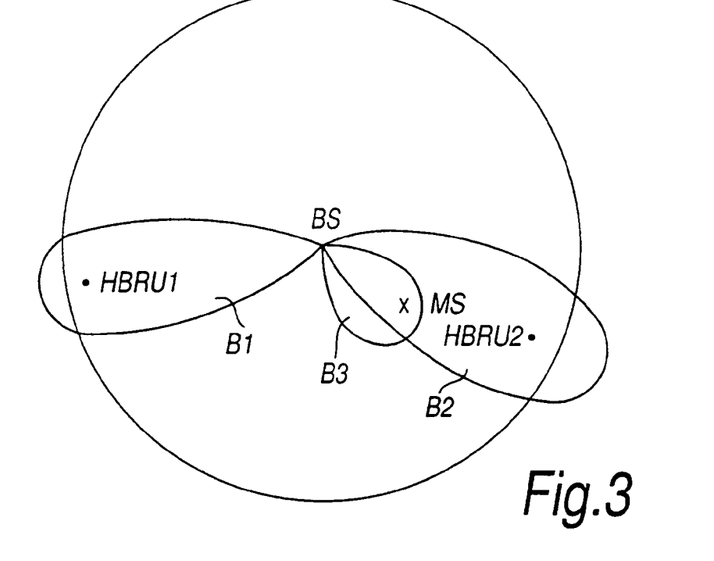
FIG. 3 shows a schematic view of a cell area of a cellular communications network.

FIG. 3 shows schematically the area of one cell of a CDMA mobile communication system. In this embodiment, a base station BS of the cell utilises beamforming adaptive array antennae for transmitting downlink signals to the mobile stations operating in the cell area. The purpose of such beamforming adaptive array antennae is to direct the downlink signal for a particular user to the current location of the user within the cell area, rather than transmitting it uniformly across the cell area. In this way, the interference caused to other users is reduced and so, in theory, the maximum number of users that can be supported per cell can be increased.

By way of example, FIG. 3 shows a situation in which two high bit-rate users HBRU1 and HBRU2 are operating within the cell area of the base station BS. A first beam B1 is formed in a first direction by the base station for downlink communication with the user HBRU1. A second beam B2 is formed in a second direction, different from the first direction, by the base station for downlink communication with the user HBR2.

A mobile station MS of a further, low- or medium-bit-rate user is also operating in the cell area, and the base station BS communicates with the MS using a third beam B3.

As shown in FIG. 3, the angular position of the MS is different from the angular position of the user HBRU1 but is approximately the same as the angular position of the user HBRU2. This means that the amount of interference caused to the MS by the user HBRU1 is low (negligible), whereas that caused by the user HRBU2 is highly significant.

Bearing in mind that in practice the number of potentially-interfering high-bit-rate users in any particular cell may exceed the number m of interfering signals which a mobile station can process, it is desirable to take account of the positions (relative to the subject mobile station), and/or other factors such as downlink transmission power, of the potentially-interfering users to select the interfering signals that are to be cancelled by the subject mobile station.

In this case, as in the first embodiment described with reference to FIGS. 1 and 2, the base station supplies information to each mobile station operating within its cell area to identify directly, or to facilitate identification at the mobile station of, the interfering users relevant to that particular mobile station.

Figure 4:
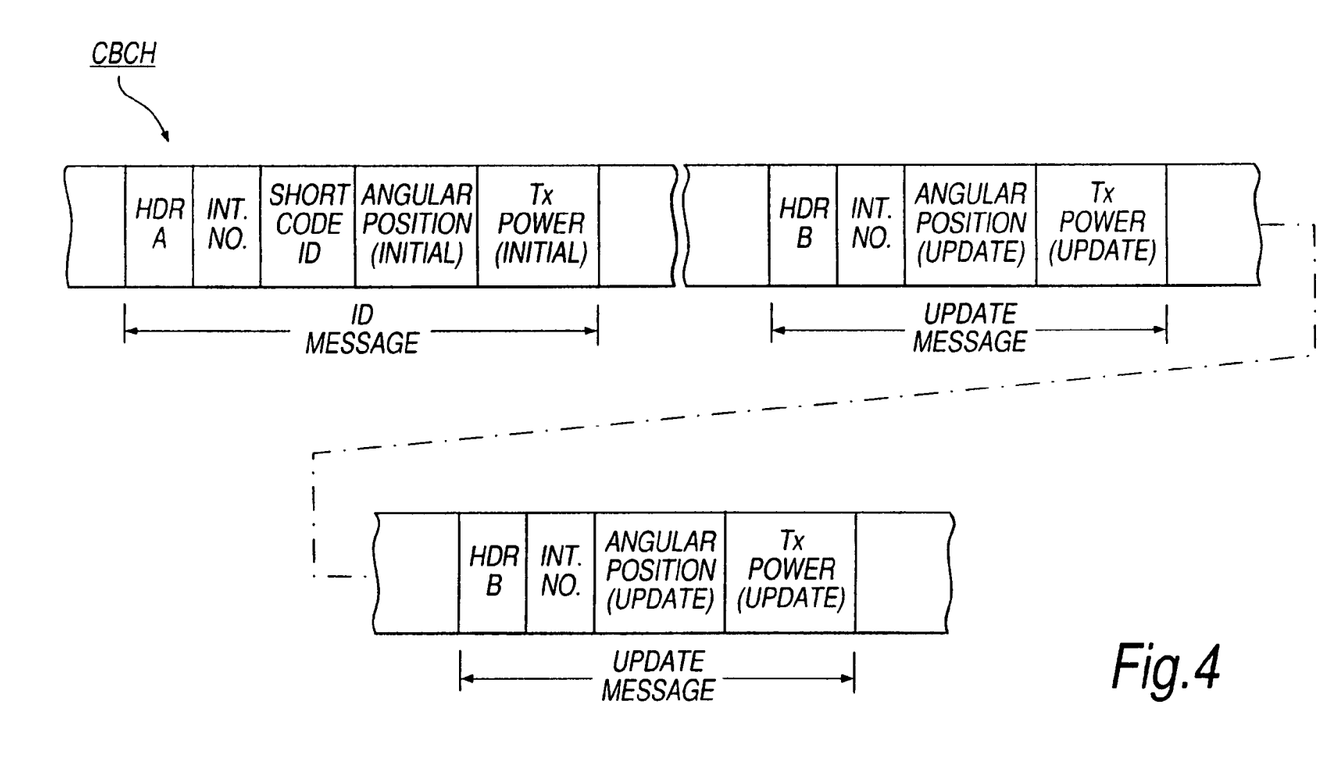
FIG. 4 shows possible formats of messages for transmission from a base station to a mobile station in an embodiment of the present invention.

In a first possible implementation, shown in FIG. 4, the base station broadcasts two different types of message to all the mobile stations in its cell area using a common broadcast channel (CBCH).

The first type of message, called an ID message, commences with a first type of header (HDR A), enabling the message type to be identified at the receiving mobile station. After the header, the next field in the ID message is an interferer number field, containing an integer from 1 to x, where x is the number of candidate interfering signals handled by the base station (x>m, where m is the number of processing units PU in the interfering signal processing section 14). The next field of the ID message contains the item of code information $CI_i$ assigned to the interfering user having the interferer number specified in the preceding field. The final two fields of the ID message contain respectively an initial angular position and an initial downlink transmission power of the interfering user specified in the interferer number field.

Such an ID message is transmitted, for example, whenever a new candidate interfering signal (e.g. HBRU) becomes active within the cell area.

The other type of message broadcast by the base station to the mobile stations in its cell area is an update message which has a second header (HDR B) different from the first header (HDR A). As for the ID message, the first field in the update message following the header is an interferer number field which, as before, is used to identify the candidate interfering user to which the message relates. The final two fields of the update message are, respectively, an angular position update field and a downlink transmission power update field. These update fields either contain directly the latest angular position and downlink transmission power of the user concerned or, alternatively, information for combination with the initial angular position and downlink transmission power specified in an ID message relating to the user concerned to enable the mobile station itself to determine the latest angular position and downlink transmission power of the user concerned. In the latter case, for example, the information contained in the update field could simply be the change in angular position or downlink transmission power since the original ID message or the last update message for the user concerned. Assuming that such changes are small, this enables the length of the update message to be reduced as compared to that of an original ID message.

The update messages are transmitted for example at regular intervals, for example every 10 ms frame.

Figure 5:
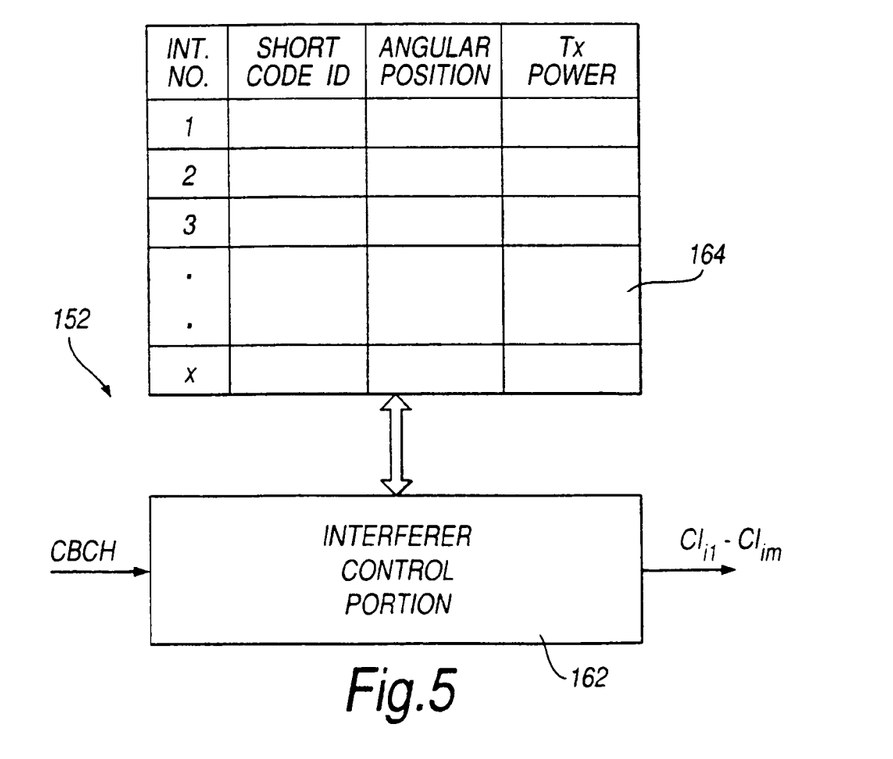
FIG. 5 shows parts of interferer assessment circuitry in an embodiment of the present invention.

FIG. 5 shows a block diagram of parts of interferer assessment circuitry 152 which can be used to process the ID messages and update messages broadcast via the CBCH of FIG. 4. This interferer assessment circuitry 152 takes the place of the code identity derivation portion 52 shown in FIG. 1. However, because in this embodiment the code information and interference judgement information (ID and update messages) are broadcast via the CBCH, a separate receiver circuit (not shown) is required (in addition to the wanted signal processing section 12 in section 12 in FIG. 1) to process the information sent via the CBCH.

Because a separate receiver is used to process the CBCH, it is possible for the CBCH to be one of the interfering signals selected for cancelling in the mobile station, if it is found that the CBCH is a significant interfering signal.

The interferer assessment circuitry 152 comprises an interferer control portion 162 and an interferer information storage portion 164.

The interferer information storage portion 164 is in the form of a table having entries from 1 to x corresponding respectively to the x candidate interfering users notified by the base station. Each entry has respective short code ID, angular position, and downlink transmission power fields for the candidate interfering user concerned.

When an ID or update message is received at the mobile station via the CBCH, the interferer control portion 162 processes the message to determine its type (ID or update). If the message is an ID message (HDR A) the short code ID, initial angular position and initial downlink transmission power contained in the message are stored in the appropriate entry for the candidate interfering user in the interferer information storage portion 164. If the message is an update message (HDR B) the interferer control portion 162 uses the angular position update and downlink transmission power update information contained in the message to update the angular position and transmission power field of the entry in the interferer information storage portion 164 for the candidate interfering user concerned.

Periodically, for example every 10 ms frame, or each time a new ID or update message is received, the interferer control portion 162 processes the information in the interferer information storage portion 164 to assess what interference effect each candidate interfering user in the table is likely to have at its mobile station. The assessment is made based on a comparison of the angular position of its mobile station (notified to it periodically by the base station) with the latest angular position of each candidate interfering user as maintained in the angular position field of the table. The assessment process also takes into account the downlink transmission powers of the candidate interferers. Those with higher downlink transmission powers (in particular those at the periphery of the cell area) are likely to be more significant interferers than those with low transmission powers.

Based on the results of the assessment of the likely interference effects of the different candidate interfering users, the interferer control portion 162 then selects the m interfering users most likely to be significant to its mobile station and supplies the respective items of code information $CI_{i1}$ to $CI_{im}$ for those m users (as stored in the storage portion 164) to the processing units PU in the interfering signal processing section (14 in FIG. 1).

Although as described above the base station transmits the downlink transmission power of the candidate interferers to the mobile station, it would be possible instead to transmit some measure of the distance between the base station and the interfering user concerned. Also, it is not necessary that both angular position and downlink transmission power be taken into account. Either of these two types of information alone could be transmitted and used to select the most significant interferers.

It is also not necessary for the information to be broadcast on the CBCH in the particular format shown in FIG. 4. A large variety of different formats could be used. Instead of individual messages for the different candidate interferers, the information could be sent in blocks containing in a predetermined order the information for all the candidate interferers.

The actual data rates of the candidate interferers (e.g. HBRUs) could also be broadcast to the mobile station to enable them to take account of these in selecting the most significant interferers. For example, an HBRU with a very high rate, even if spaced significantly far away from the subject mobile station, might still be a more significant interferer than another HBRU having a lower data rate but much closer to the subject mobile station.

In the above example, the selection of the likely significant interfering users is made by the mobile station based on broadcast information from the base station. This requires the mobile station to have relatively complex circuitry for processing the broadcast messages from the base station, which may be undesirable from the point of view of cost.

It is alternatively possible for the selection of the likely significant interferers for each mobile station to be made individually for each mobile station by the base station, thereby avoiding complex assessment and selection circuitry in the mobile station. The base station is aware of which users are high-bit-rate users and also of the angular position of each user in its cell area (from uplink parameters or mobile station location techniques) and of the base station downlink transmission power level for each user. Based on this information, the base station is able to assess itself, for each mobile station, which users are likely to be the most significant interferers and then simply transmit the items of code information CI for the m most significant interferers to the mobile station concerned on the associated control channel ACCH (or some other dedicated control channel for the mobile station). In this case, the code identity derivation unit 52 described above with reference to FIG. 1 can be used without modification.

In this case, the items of code information could be transmitted to a particular mobile station during (or just after) the setting up of a call by the mobile station and thereafter periodically to reflect the changing interference conditions within the cell.

Although as described above, the processing unit PU of the interfering signal processing section and the wanted signal processing section are both in the form of a RAKE receiver having plural fingers, it is not necessary to use such RAKE receivers for one or both sections. The RAKE receivers could be replaced by matched filters.

Although, as described above, significant interfering users are likely to be high bit-rate users, the present invention can be applied advantageously to reducing interference from any designated user whose spreading code can be identified to the mobile station.

Embodiments of the present invention are applicable to the following types of communication system:

(1) UMTS frequency division duplex (FDD) mode (W-CDMA)

(2) UMTS time division duplex (TDD) mode (both as proposed by the Association of Radio Industries and Businesses (ARIB) and as proposed by ETSI {TD-CDMA})

(3) IS-95

(4) cdma2000

(5) other DS CDMA systems

In all above cases the standard needs to incorporate the "BTS periodically broadcasting or informing the mobile stations of the short spreading code identity (and if necessary long scrambling code identity) of the interfering downlink channels". So IS-95 standard as it is cannot be utilised. It needs to be changed or upgraded. In principal most standards are upgraded for example: GSM by means of Phase1, Phase2, Phase 2Plus etc.

What is claimed is:

1. A mobile station, for use in a CDMA communications network, comprising:

a wanted signal processing portion which processes an input signal, representing a CDMA transmission signal received at the mobile station from a base station of the network, to derive therefrom a wanted signal embodying a preselected spreading code;

a code information receiving portion which receives from the base station code information identifying a further spreading code assigned by the network to an interfering signal of another network user; and an interfering signal process portion which employs the further spreading code identified by the received code information to reduce the interference effect of that interfering signal on the derived wanted signal, wherein said input signal of the wanted signal processing portion is pre-processed by the interfering signal processing portion to reduce or cancel components in the input signal associated with each said interfering signal, said interfering signal processing portion is operable to derive, for each said interfering signal, a corresponding interference cancellation signal representative of a component in said input signal associated with that interfering signal, and said interfering signal processing portion has, for each said interfering signal, a corresponding processing unit for deriving said interference cancellation signal corresponding to that interfering signal, which processing unit comprises:

a code generator which generates the identified spreading code assigned to said interfering signal;

a despreader connected for receiving a first signal representing the received CDMA transmission signal and also connected to said code generator for receiving the generated spreading code, and operable to despread the first signal to produce a second signal representing said interfering signal; and a respreader connected to said despreader for receiving therefrom said second signal and also connected to said code generator for receiving the generated spreading code, and operable to respread said second signal to produce said corresponding interference cancellation signal.

2. A mobile station, for use in a CDMA communications network, comprising:

a wanted signal processing portion which processes an input signal, representing a CDMA transmission signal received at the mobile station from a base station of the network, to derive therefrom a wanted signal embodying a preselected spreading code;

a code information receiving portion which receives from the base station code information identifying a further spreading code assigned by the network to an interfering signal of another network user; and an interfering signal processing portion which employs the further spreading code identified by the received code information to reduce the interference effect of that interfering signal on the derived wanted signal, wherein said input signal of the wanted signal processing portion is pre-processed by the interfering signal processing portion to reduce or cancel components in the input signal associated with each said interfering signal, said interfering signal processing portion is operable to derive, for each said interfering signal, a corresponding interference cancellation signal representative of a component in said input signal associated with that interfering signal, and said interfering signal processing portion further comprises:

a signal delay element connected for receiving a basic signal representing said received CDMA transmission signal and operable to delay the signal by a preselected delay tine to produce a delayed version thereof, said input signal of each said processing unit being provided directly by, or being derived from, said basic signal; and a subtractor connected for receiving said delayed version of said basic signal and each said interference cancellation signal, and operable to produce said input signal of said wanted signal processing portion in dependence upon the difference between said delayed version and each interference cancellation signal.

3. A mobile station, for use in a CDMA communications network, comprising:

a wanted signal processing portion which processes an input signal, representing a CDMA transmission signal received at the mobile station from a base station of the network, to derive therefrom a wanted signal embodying a preselected spreading code;

a code information receiving portion which receives from the base station code information identifying a further spreading code assigned by the network to an interfering signal of another network user; and an interfering signal processing portion which employs the finer spreading code identified by the received code information to reduce the interference effect of that interfering signal on the derived wanted signal, wherein said base station is operable to form respective beams for directing its CDMA transmission signals towards their respective users and is also operable to transmit to said mobile station interference judgement information providing, for each of a plurality of users operating in its area, information relevant to assessing an interference effect on the wanted signal of said mobile station of an interfering signal of the user concerned;

said mobile station comprising:

an interfering signal assessment portion which assesses said interference effect of the interfering signal of each user of said plurality based on the received interference judgement information; and an interfering signal selection portion which selects one or more of the interfering signals from amongst the respective interfering signals of the plurality of users based on the results of the assessment.

4. A mobile station as claimed in claim 3, wherein said interference judgement information for such a user of said plurality includes position information of that user.

5. A mobile station as claimed in claim 3, wherein said interference judgement information for a user of said plurality of users includes angular position information of the user relative to the base station.

6. A mobile station as claimed in claim 3, wherein said interference judgement information for a user of said plurality of users includes downlink transmission power level information of the user.

7. A mobile station as claimed in claim 3, wherein said interfering signal assessment portion takes account of the position of each of said plurality of users relative to the position of the mobile station in assessing said interference effect.

8. A mobile station as claimed in claim 3, wherein said interfering signal assessment portion include storage which stores the received interference judgement information for each of said plurality of users.

9. A mobile station as claimed in claim 3, wherein the plurality of users are users whose downlink transmission rates exceed a predetermined threshold value.

10. A base station, for use in a CDMA communications network, comprising:

an interfering signal designating portion which designates at least one of a plurality of downlink signals transmitted by the base station as being an interfering signal having an interference effect on a wanted signal of a subject mobile station of the network;

a code information transmission portion which includes, in a predetermined control signal transmitted by the base station to said subject mobile station code information, identifying a spreading code assigned by the network to the designated interfering signal, for use by the subject mobile station to reduce said interference effect of said interfering signal on said wanted signal; and an interfering signal assessment portion which assesses, for each of a plurality of users operating in the area of the base station, said interference effect on said wanted signal of said subject mobile station of the downlink signal of the user concerned; said interfering signal designating portion being operable to determine which downlink signals of the plurality of users are to be designated as interfering signals based on the results of the assessment.

11. A base station as claimed in claim 10, wherein said interfering signal assessment portion is operable to assess said interference effect in dependence upon the bit rate of the downlink signal.

12. A base station as claimed in claim 10, wherein said interfering signal assessment portion is operable to assess said interfering effect in dependence upon a position of the user relative to said subject mobile station.

13. A base station as claimed in claim 10, wherein said interfering signal assessment portion is operable to assess said interference effect in dependence upon one or more of the following criteria:
- an angular position of the user relative to said base station;
- an angular position of said subject mobile station relative to the base station;
- a distance of the user from the base station;
- a distance of the subject mobile station from the base station;
- a downlink transmission power level of the user; and
- a downlink-signal bit-rate of the user.

14. A base station, for use in a CDMA communications network, comprising:
- an interfering signal designating portion which designates at least one of a plurality of downlink signals transmitted by the base station as being an interfering signal having an interference effect on a wanted signal of a subject mobile station of the network;
- a code information transmission portion which includes, in a predetermined control signal transmitted by the base station to sad subject mobile station, code information, identifying a spreading code assigned by the network to the designated interfering signal, for use by the subject mobile station to reduce said interference effect of said interfering signal on said wanted signal;
- a beamformer which forms respective beams for directing its CDMA transmission signals towards their respective users; and
- an interference judgement information transmission portion which includes, in a predetermined control signal transmitted by the base station to said subject mobile station interference judgement information providing, for each of a plurality of users operating in the area of the base station, information relevant to assessing an interference effect on said wanted signal of the downlink signal of the user concerned, wherein said interference judgement information for a user of said plurality of users includes position information of that user.

* * * * *